United States Patent
Gust et al.

(10) Patent No.: US 6,395,986 B1
(45) Date of Patent: May 28, 2002

(54) ELECTRICAL CONVOLUTED TUBING WITH OVERMOLDED GROMMET

(75) Inventors: James M. Gust, Wolcottville; Scott Garver, Fort Wayne, both of IN (US)

(73) Assignee: Lyall Assemblies, Inc., Albion, IN (US)

( * ) Notice: Subject to any disclaimer, the term of this patent is extended or adjusted under 35 U.S.C. 154(b) by 0 days.

(21) Appl. No.: 09/665,478

(22) Filed: Sep. 20, 2000

(51) Int. Cl.7 .................................................. H02G 3/18
(52) U.S. Cl. ..................... 174/65 G; 174/65 R; 16/2.1; 248/56; 439/604
(58) Field of Search ........................... 174/65 G, 65 SS, 174/65 R, 152 G, 153 G, 135, 151, 153 R; 16/2.1, 2.2; 248/56; 138/156; 439/604, 587, 471

(56) References Cited

U.S. PATENT DOCUMENTS

| | | | | |
|---|---|---|---|---|
| 4,685,173 A | * | 8/1987 | Pavur | 174/156 G X |
| 4,797,513 A | * | 1/1989 | Ono et al. | 174/153 |
| 4,864,080 A | * | 9/1989 | Fochler et al. | 174/65 G |
| 5,967,194 A | * | 10/1999 | Martin | 138/156 |
| 6,081,964 A | * | 7/2000 | Mori | 16/2.2 |

FOREIGN PATENT DOCUMENTS

| | | | | |
|---|---|---|---|---|
| JP | 405198228 | * | 8/1993 | 174/65 G |
| JP | 406038340 | * | 2/1994 | 174/65 G |

* cited by examiner

*Primary Examiner*—Dean A. Reichard
*Assistant Examiner*—Dhiru R Patel
(74) *Attorney, Agent, or Firm*—Taylor & Aust, P.C.

(57) ABSTRACT

An electrical tubing assembly includes an electrical tubing having a non-smooth outer surface. A grommet has an outer periphery, an annular groove in the outer periphery, and an inner surface. The inner surface is in continuous and intimate physical contact with the outer surface of the tubing.

12 Claims, 2 Drawing Sheets

ELECTRICAL CONVOLUTED TUBING WITH OVERMOLDED GROMMET

BACKGROUND OF THE INVENTION

1. Field of the Invention.

The present invention relates to electrical assemblies, and, more particularly, to electrical tubing assemblies.

2. Description of the Related Art.

An electrical tubing assembly is used to carry electrical conductors from one location to another and protect the electrical conductors from damage caused by mechanical contact such as may occur during impact or vibration. It is known to provide electrical convoluting tubing to carry electrical conductors from one location to another. Electrical convoluted tubing typically includes a plurality of generally parallel, annular convolutions which allow the tubing to be flexed as it extends from one location to another. The tubing may include a longitudinal split along one side thereof allowing the electrical conductors to be inserted or removed therefrom.

To prevent the convoluted tubing from being physically damaged and thereby possibly damaging the electrical conductors therein, it is also known to carry the convoluted tubing within a rubber grommet positioned within a cut-out in a mounting bracket. For example, electric motors, engines, household appliances, etc. may include mounting brackets for carrying rubber grommets. The grommet is a separate piece which is first inserted into a cut-out in the mounting bracket. Thereafter, it is necessary to slide the convoluted tubing through the grommet. A problem with this type of assembly is that often times the tubing may be of considerable length to extend between the desired termination locations. It is difficult to pull the tubing through the grommet which results in considerable time being expended to run the electrical conductors from one location to another. Moreover, it is not uncommon to break the convoluted tubing as a result of the axial force applied thereto trying to pull the tubing through the grommet. Because of these difficulties, it is fairly common to first run the electrical conductors through the various grommets and then merely cut the convoluted tubing to extend between the grommets without going through the grommet. Electrical conductors may therefore be exposed at locations adjacent to the grommets, allowing the conductors to be physically damaged and possibly causing an electrical shorting condition.

What is needed in the art is an electrical tubing assembly which ensures that the conductors remain within the tubing radially within a grommet, allows electrical conductors to be run from one location to another in a simpler and easier manner, and discourages cutting of the tubing adjacent the grommets.

SUMMARY OF THE INVENTION

The present invention provides an electrical tubing assembly with a grommet which is overmolded around an electrical convoluted tubing.

The invention comprises, in one form thereof, an electrical tubing assembly including an electrical tubing having a non-smooth outer surface. A grommet has an outer periphery, an annular groove in the outer periphery, and an inner surface. The inner surface is in continuous and intimate physical contact with the outer surface of the tubing.

An advantage of the present invention is that the grommet is in intimate physical contact with the outer surface of the electrical convoluted tubing, thereby preventing axial displacement of the grommet relative to the convoluted tubing.

Another advantage is that the grommet is fromed around the convoluted tubing during manufacturing, thereby preventing the unnecessary assembly step of pulling the convoluted tubing through the grommet.

Yet another advantage is that cutting of the convoluted tubing on either side of the grommet is inhibited as being unnecessary, and thereby the grommet provides a moisture seal to the electrical conductors carried within the convoluted tubing.

A further advantage is that the relative non-movement between the grommet and convoluted tubing in the axial direction eliminates abrasion to the outer surface of the convoluted tubing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
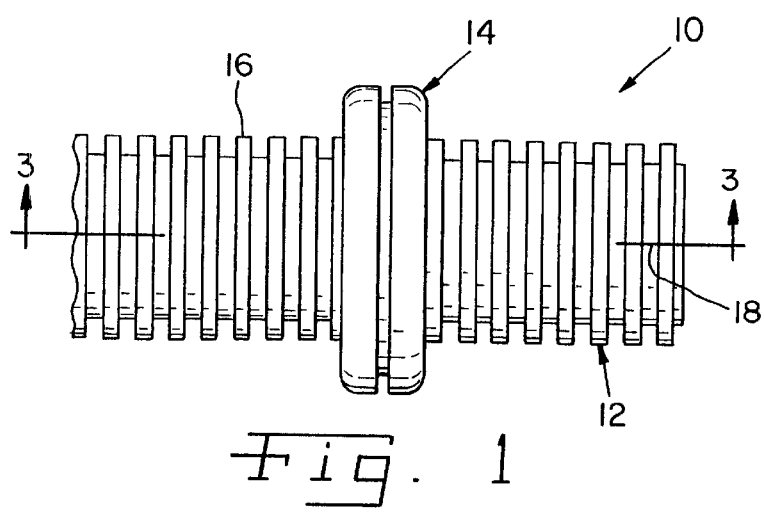
FIG. 1 is a perspective view of an embodiment of an electrical tubing assembly of the present invention.
Figure 2:
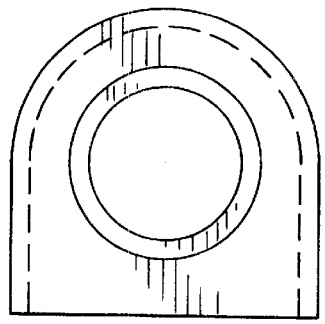
FIG. 2 is an end view of electrical tubing assembly shown in FIG. 1.
Figure 3:
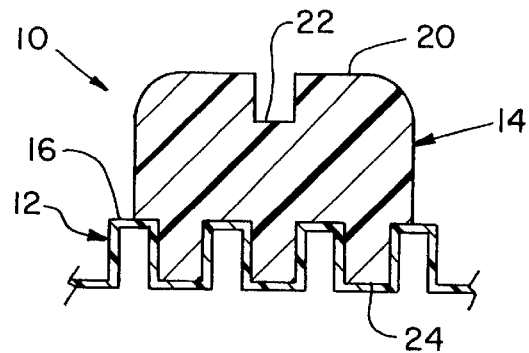
FIG. 3 is a fragmentary, sectional view taken along line 3—3 in FIG. 1.

Referring now to the drawings, and more particularly to FIGS. 1–3, there is shown an embodiment of an electrical tubing assembly 10 of the present invention. Electrical tubing assembly 10 generally includes an electrical convoluted tubing 12 and a grommet 14.

Convoluted tubing 12 has a non-smooth outer surface 16. More particularly, convoluted tubing 12 has a plurality of generally parallel, annular convolutions around outer surface 16. The convolutions thus define a plurality of longitudinally adjacent lands and valleys alternately positioned adjacent to each other along the length of tubing 12. Tubing 12 is formed from a flexible material such as plastic, with the convolutions formed therein. The flexible material and convolutions allow tubing 12 to be positioned or routed along any desired surface so that electrical conductors carried therein (not shown) will likewise be routed from one location to another. For example, tubing 12 may be used to carry and protect electrical conductors from a junction box to terminal connection locations associated with an electric motor, generator or engine.

The convolutions formed in outer surface 16 of tubing 12 are illustrated as being annular in the embodiment shown in FIGS. 1–3. However, it is also to be understood that convolutions may be formed with other than an annular shape around the outer surface 16 of tubing 12. For example, the convolutions may extend in a continuous and spiral manner around outer surface 16 of tubing 12. The term "non-smooth" used to describe outer surface 16 of tubing 12 is not intended to mean mere surface roughness of the tubing. Rather, tubing 12 is formed with a "non-smooth" surface which allows flexing and bending of tubing 12 without kinking or other physical damage.

Tubing 12 may also optionally include longitudinal split 18 (FIG. 1) extending the entire length or only a portion of the length thereof to allow electrical conductors to be inserted or removed. Tubing 12 is preferably formed from plastic, but may also be formed from other suitable materials, such as a thin walled, metal material.

Grommet 14 includes an outer periphery 20 with an annular groove 22 extending radially inward therefrom. Annular groove 22 allows grommet 14 to be coupled with and carried by a mounting bracket extending from a work piece. The mounting bracket has a cut-out which is shaped corresponding to the shape of annular groove 22. Grommet 14 is snap fitted into the cutout out of the mounting bracket such that annular groove 22 is positioned radially within the cut-out in the mounting bracket. The mounting bracket may be attached, e.g., to the side of an electric motor or the like.

Grommet 14 also includes an inner surface 24 which directly contacts outer surface 16 of tubing 12. Inner surface 24 is formed so as to be in continuous and intimate physical contact with outer surface 16 of tubing 12. The method of manufacturing grommet 14 to effect the continuous and intimate physical contact between grommet 14 and tubing 12 will be described in more detail hereinafter.

Grommet 14 is formed from a flexible material allowing grommet 14 to be snap fitted into a cut-out in an associated mounting bracket carried by the work piece, work machine or the like with which electrical tubing assembly is utilized. Grommet 14 is preferably formed from an elastomeric material, such as rubber, but may also be formed from a suitable plastic material providing elastic deformation allowing grommet 14 to be snap fitted within the cut-out of an associated bracket.

Figure 4:
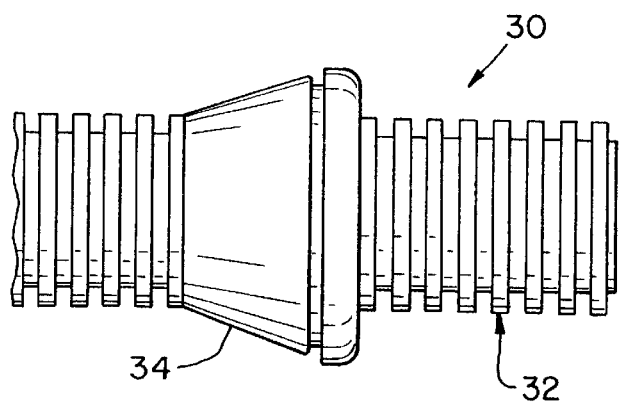
FIGS. 4 and 5 illustrate another embodiment of an electrical tubing assembly of the Present invention.
Figure 5:
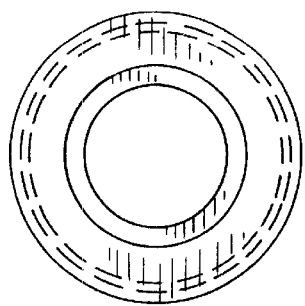

FIGS. 4 and 5 illustrate another embodiment of an electrical tubing assembly 30 of the present invention. Electrical tubing assembly 30 also includes electrical convoluted tubing 32 and a grommet 34. Grommet 34 is formed with an inner surface which is in continuous and intimate physical contact with the outer surface of tubing 32, as described above with reference to electrical tubing assembly 10 shown in FIGS. 1-3. Grommet 34 has an outer periphery with a generally frustroconical shape as shown. The frustroconical shape assists in snap fitting grommet 34 into the cut-out of a mounting bracket (not shown).

Figure 7:
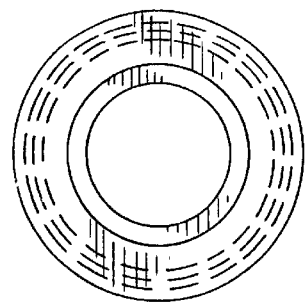
FIGS. 6 and 7 illustrate yet another embodiment of an electrical tubing assembly of the present invention.
Figure 6:
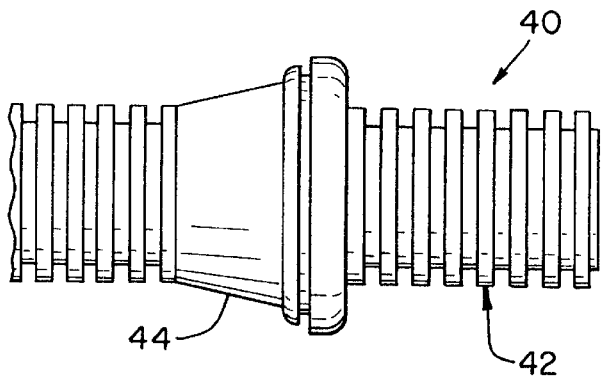

FIGS. 6 and 7 illustrate another embodiment of an electrical tubing assembly 40 of the present invention. Electrical tubing assembly 40 likewise includes an electrical convoluted tubing 42 and a grommet 44. Grommet 44 is formed with an inner surface which is also in continuous and intimate physical contact with an outer surface of tubing 42. The outer periphery of grommet 44 has an overall shape which is somewhat of a combination of the shape of grommets 14 and 34 shown in FIGS. 1 and 4. That is, grommet 44 has a portion of the outer surface with a generally frustroconical shape and a disc shaped portion positioned adjacent to the frustroconical shaped portion.

Figure 8:
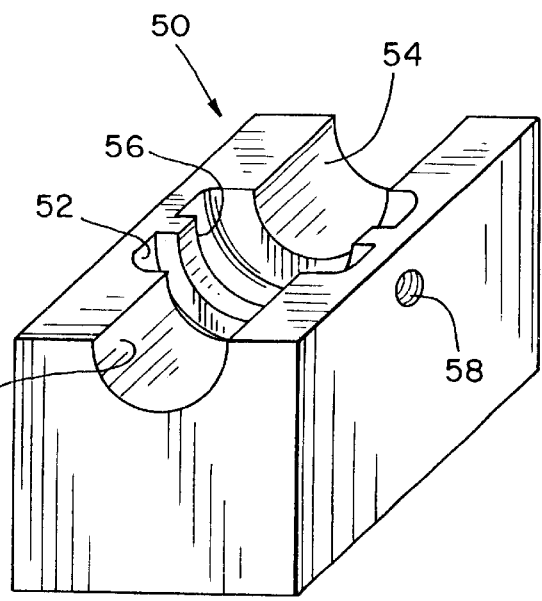
FIG. 8 is a perpective view of a mold half used to form the eletrical tubing assembly shown in FIGS. 1–3.

Referring now to FIG. 8, a method of the present invention for forming a grommet around an electrical convoluted tubing will be described in more detail. FIG. 8 is a perspective view of one-half of a mold used in an overmolding process to form a grommet around a convoluted tubing. The other half of the mold is configured substantially identically, and thus is not shown for simplicity sake. The mold halves are fastened together and used in an overmolding process, as will be described hereinafter.

Mold half 50 includes a work piece channel 52 and an insert channel 54. Insert channel 54 has an inside diameter which is approximately the same as the outside diameter of a convoluted tubing 12, 32 or 42 positioned therein. Work piece channel 52 has an interior shape corresponding to the exterior shape of the grommet 14, 34 or 44 to be formed. In the embodiment shown in FIG. 8, work piece channel 52 is shown with a shape corresponding to the curved exterior portion of grommet 14 shown in FIGS. 1–3. Radially inward projection 56 corresponds to annular groove 22 formed in grommet 14.

In the overmolding process, electrical convoluted tubing 12 is positioned within insert channel 54. The outside diameter of tubing 12 substantially fills insert channel 54 such that injected flexible material does not flow through insert channel 54 during the injection molding process. An insert (not shown) corresponding to the inside diameter of tubing 12 may be positioned within tubing 12 to prevent radially inward deformation of tubing 12 during the injection molding process. The insert may be rigid, or slightly radially compressible. The necessity for such an insert depends upon the rigidity of tubing 12 and the pressure under which the elastomeric or plastic material is injected in work piece channel 52. The other half of the mold (not shown) is then coupled with mold half 50 so that each mold half surrounds tubing 12. An elastomeric or plastic material is injected through injection port 58 and into work piece channel 52. The injected material is then allowed to cool to form grommet 14 surrounding and intimately in contact with outer surface 16 of tubing 12. The mold halves are then disassembled and electrical tubing assembly 10 is removed therefrom.

In contrast with conventional electrical tubing assemblies, grommet 14 has an inside surface which exactly conforms to the outer surface of tubing 12. Grommet 14 thus is axially fixed with respect to tubing 12 and cannot slide in an axial direction with respect to tubing 12. Moreover, it is unnecessary to assemble a grommet around the outer periphery of a convoluted electrical tubing, thereby saving assembly time and associated costs. By preventing the grommet from sliding in an axial direction along the convoluted tubing, the electrical conductors within the tubing are likewise not displaced which prevents undue stress of electrical terminals attached to the ends of the electrical conductors carried therewithin.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical tubing assembly, comprising:
   an electrical convoluted tubing with an outer surface; and
   a grommet having an inner surface, an outer periphery and
   an annular groove in said outer periphery, said grommet being overmolded around a portion of said outer surface of said convoluted tubing, said inner surface being in continuous and intimate physical contact with said outer surface of said convoluted tubing.

2. The electrical tubing assembly of claim 1, said convoluted tubing including a plurality of generally parallel, annular convolutions around said outer surface.

3. The electrical tubing assembly of claim 1, said grommet being constructed from a material selected from one of an elastomeric and plastic material.

4. The electrical tubing assembly of claim 1, said grommet being generally disc shaped.

5. The electrical tubing assembly of claim 1, said grommet being generally frustroconical shaped.

6. An electrical tubing assembly, comprising:

an electrical tubing having a non-smooth outer surface; and a grommet having an outer periphery, an annular groove in said outer periphery, and an inner surface, said inner surface being in continuous and intimate physical contact with said outer surface of said tubing.

7. The electrical tubing assembly of claim 6, said grommet being formed by the process of overmolding around a portion of said outer surface of said electrical tubing.

8. The electrical tubing assembly of claim 6, said electrical tubing including a plurality of generally parallel, annular convolutions around said outer surface.

9. The electrical tubing assembly of claim 6, said grommet being constructed from a material selected from one of an elastomeric and plastic material.

10. The electrical tubing assembly of claim 6, said grommet being generally disc shaped.

11. The electrical tubing assembly of claim 6, said grommet being generally frustroconical shaped.

12. A method of forming an electrical tubing assembly, comprising the steps of:

providing a mold having a mold cavity, said mold cavity including a work piece channel associated with a grommet to be formed and an insert channel;

positioning an electrical tubing having a non-smooth outer surface within said insert channel of said mold cavity; and injecting a flexible material into said work piece channel of said mold cavity to form said grommet around said electrical tubing, said grommet having an outer periphery, an annular groove in said outer periphery, and an inner surface, said inner surface being in continuous and intimate physical contact with said outer surface of said tubing.

* * * * *